United States Patent Office 3,211,723
Patented Oct. 12, 1965

3,211,723
FLUORINATION OF STEROIDS
Fred Kagan and David G. Martin, Kalamazoo, Mich.,
assignors to The Upjohn Company, Kalamazoo, Mich.,
a corporation of Delaware
No Drawing. Filed Jan. 4, 1961, Ser. No. 80,544
11 Claims. (Cl. 260—239.55)

This invention relates to a novel process for the preparation of fluorinated steroids. More particularly, it relates to a process for the preparation of steroids containing fluoroformyl (—COF), difluoromethyl, difluoromethylene and trifluoromethyl groups.

It has been shown previously that relatively simple organic compounds containing carbonyl groups (for example, aliphatic and simple alicyclic ketones) can be fluorinated using sulfur tetrafluoride; see, for example, Smith et al., J. Amer. Chem. Soc. 81, 3165 (1959), ibid., 82, 543 (1960), and U.S. Patent 2,859,245. However, it has not been suggested previously that steroids containing carbonyl groups could be fluorinated in this manner. Further, we have found that when attempting to fluorinate steroids using sulfur tetrafluoride under the reaction conditions given in the cited references, no carbonyl conversion occurs in the lower range of the recommended reaction temperatures (25 to 350° C.) and almost total loss of starting material due to charring and decomposition occurs in the higher range of temperatures.

We have now found that fluorination of steroids containing carbonyl groups can be accomplished readily using sulfur tetrafluoride under reaction conditions to be described hereinafter. Our novel process makes available a class of fluorinated steroids which are novel and which could not be prepared readily by previously available methods.

The novel process of the invention consists in a process for the preparation of a fluorosteroid which comprises reacting in the presence of an inert solvent a steroid having at least one oxygen doubly bonded to one carbon, the other atoms attached to said carbon being selected from the class consisting of hydrogen, oxygen, halogen, and carbon, with sulfur tetrafluoride in the presence of a Lewis acid at a temperature within the range of about 0° C. and 100° C., said Lewis acid being present in the proportion of at least 1 mole per mole of steroid for each carbonyl function in the latter which is to be fluorinated.

The term "steroid having at least one oxygen doubly bonded to one carbon atom, the other atoms attached to said carbon being selected from the class consisting of hydrogen, oxygen, halogen, and carbon" means a steroid which contains one or more carbonyl functions present in groups selected from the class consisting of keto, formyl, carboxy, and haloformyl

The nature of the fluorosteroid produced by the process of the invention depends upon the nature of the carbonyl function in the steroid starting material. Thus a keto group in the starting steroid is converted to a gem-difluoro group. A formyl group in the starting steroid is converted to a difluoromethyl group. A carboxy group in the starting steroid is converted either to a fluoroformyl or to a trifluoromethyl group according to the conditions employed in the reaction as described more fully hereinafter. A haloformyl group in the starting steroid is converted to a trifluoromethyl group in the process of the invention. Where the starting steroid contains more than one carbonyl function of the types described above, the order in which the various carbonyl functions will react varies according to the position of the carbonyl function in the steroid molecule and the nature of adjacent groups in the molecule. In general, a formyl group reacts more readily than a keto group and a keto group reacts more readily than a carboxy or haloformyl group. A carboxy group situated in a side chain reacts more readily than a carboxy attached directly to the steroid nucleus. The ease with which a keto group reacts depends on its position in the molecule and the amount of conjugation associated therewith. For example, the order of reactivity of keto groups most commonly present in steroid molecules is as follows: saturated 3-ketone>17-ketone>20-ketone>conjugated ketone>11-ketone.

The term "Lewis acid" is well recognized in the art and is defined succinctly by Fieser and Fieser, "Organic Chemistry," Third edition, page 138 (Reinhold, 1956). Examples of such compounds are hydrogen fluoride, boron trifluoride, arsenic trifluoride, phosphorus pentafluoride, titanium tetrafluoride and the like. The preferred Lewis acid for use in the process of the present invention is hydrogen fluoride.

The term "inert solvent" means any solvent which does not interfere with the process of the invention by entering into side reactions with any of the reactants employed therin. Such inert solvents include aromatic hydrocarbons such as benzene, toluene, xylene and the like, halogenated aromatic hydrocarbons such as bromobenzene, chlorobenzene, dichlorobenzene and the like, saturated aliphatic hydrocarbons which are liquids at ordinary temperatures such as hexane, heptane, octane, dodecane, cyclohexane, cycloheptane and the like, and partially halogenated saturated hydrocarbons such as methylene chloride, ethylene dichloride, ethylidene chloride, propylene chloride, trimethtylene chloride, and the like. The preferred solvents for use in the process of the invention are the partially halogenated saturated hydrocarbons and those particularly preferred are methylene chloride and ethylene dichloride.

The process of the invention is carried out conveniently in a closed vessel the inner surface of which is made of a material, such as stainless steel, which is resistant to chemical attack by hydrogen fluoride. The steroid employed as starting material, the inert solvent and the Lewis acid are charged into the vessel in any order but the sulfur tetrafluoride is generally charged in last. Where the Lewis acid to be employed is hydrogen fluoride, the requisite amount of hydrogen fluoride can be charged into the vessel from an external source or, alternatively and preferably, the desired quantity of hydrogen fluoride can be liberated in the reaction vessel by introducing therein an amount of water calculated to give the desired quantity of hydrogen fluoride by reaction with sulfur tetrafluoride according to the following equation:

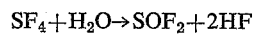

Sulfur tetrafluoride is a gas at ordinary temperatures, i.e. at temperatures of the order of 25° C., and can be introduced into the reaction vessel in a convenient manner by connecting the source of sulfur tetrafluoride to the reaction vessel and cooling the latter in, for example, an acetone and solid carbon dioxide bath. The amount of sulfur tetrafluoride passing into the reaction vessel can be measured by conventional procedures, for example, by observing the pressure drop over a constant volume reservoir.

The reaction is allowed to proceed by maintaing the reaction vessel at the desired temperature advantageously between about 0° C. and about 100° C. and preferably between 0° C. and 25° C., for the desired time which is generally between 2 and about 60 hours. The contents of the reaction vessel are preferably agitated by appropriate means throughout the reaction period. At the end of the reaction period, the desired fluorinated steroid is isolated from the reaction mixture by conventional procedures. For example, after venting the reaction vessel the reaction mixture is diluted with a solvent, advantageously the same inert solvent used in the reaction process, the solution so obtained is extracted with aqueous alkali, for example, aqueous potassium bicarbonate, and then evaporated to dryness. The residue is purified by conventional procedures such as recrystallization, chromatography, counter-current extraction or any combination of these steps.

The amount of Lewis acid employed in the process of the invention is not less than 1 mole per mole of steroid starting material for each carbonyl function in the latter which is to be fluorinated. The upper limit of concentration of Lewis acid which can be employed is not critical and is determined by practical and economical considerations. Generally speaking, the upper limit is of the order of about 200 moles per mole of steroid starting material for each carbonyl function to be fluorinated in the latter. Preferably the amount of Lewis acid employed in the process of the invention is within the range of about 1.3 to about 20 moles per mole of steroid starting material for each carbonyl function in the latter.

The amount of sulfur tetrafluoride employed in the process of the invention is advantageously not less than 2 moles per mole of steroid for each carbonyl function in the latter which is to be fluorinated. The upper limit of sulfur tetrafluoride to be employed in the process of the invention is not critical and is determined by practical and economical considerations. Generally speaking, the upper limit is of the order of about 500 moles per mole of steroid. Preferably the amount of sulfur tetrafluoride employed in the process of the invention is within the range of about 13 to 100 moles per mole of steroid for each carbonyl function in the latter which is to be fluorinated.

The ratio of sulfur tetrafluoride to Lewis acid employed in the process of the invention is, of course, governed by the limitations defined above for the concentration of each of these two reactants. However, using hydrogen fluoride as Lewis acid, the mole ratio of sulfur tetrafluoride to hydrogen fluoride is preferably in the range of from 1:0.01 to 1:3 and an especially desirable molar ratio is 1:0.22.

In a further aspect of the present invention, it has been found that the course of the fluorination process of the invention can be modified by replacing a part or the whole of the inert solvent employed in the process by a solvent which is a Lewis base. The term "Lewis base" is well-recognized in the art and is defined by Fieser and Fieser, supra. Examples of solvents which are Lewis bases and which can be used to modify the course of the fluorination process of the invention are aliphatic ethers such as diethyl ether, tetrahydrofuran, and the like, and aliphatic sulfones such as sulfolane (tetramethylene sulfone). Thus it has been found that if the inert solvent, as hereinbefore defined, employed in the process of the invention is entirely replaced by a Lewis base solvent, the fluorination of the carbonyl function in the starting steroid is inhibited. This finding is useful in the case of steroids which have a carbonyl function in the form of a side chain carboxyl group. Ordinarily, under the conditions of the process of this invention, the carboxyl group in such steroids is converted to a trifluoromethyl group. However, if the inert solvent normally employed in the process of the invention is replaced by a Lewis base solvent, the carbonyl function of the carboxyl group is unattacked but the hydroxyl group attached to the carbonyl function in the carboxyl group is replaced by fluorine. Accordingly, under such conditions the carobxyl group is converted to a fluoroformyl group. For example, when lithocholic acid acetate is subjected to the process of the invention using methylene chloride as solvent, there is obtained the corresponding trifluoromethyl compound, namely, 24,24,24-trifluoro-5β-cholan-3α-ol acetate. On the other hand, if the reaction is conducted under exactly the same conditions but the methylene chloride is replaced by tetramethylene sulfone, the sole product is the corresponding acid fluoride.

It is to be noted that it is not necessary to replace the whole of the inert solvent by a Lewis base solvent in order to inhibit the process of the invention. It is merely necessary to add to the reaction mixture, either as an extra component or in place of an equivalent amount of the inert solvent, an amount of a Lewis base solvent in the proportion of at least one mole per mole of the Lewis acid employed in the reaction.

The modifying influence of a Lewis base solvent on the course of the process of the invention can also be exploited in the following way. By adding to the reaction mixture a Lewis base solvent in an amount less than 1 mole per mole of Lewis acid present therein, it is possible to reduce the rate at which fluorination occurs in the process of the invention without completely inhibiting the reaction. This finding can be employed very usefully when the process of the invention is to be applied to the fluorination of a steroid which contains more than one carbonyl function. Under such circumstances, by adding to the reaction mixture an appropriate amount of a Lewis base solvent, the rate of fluorination can be controlled so that only one of the carbonyl functions, i.e., the more reactive one, is fluorinated. For example, using a steroid which contains both an aldehyde and a keto group in the molecule, it is possible by the addition of an appropriate amount of a Lewis base solvent, i.e., less than one molar proportion based on the amount of Lewis acid employed in the reaction, to obtain the corresponding steroid in which the aldehyde group has been converted to a difluoromethyl group but the keto group has not been fluorinated. The amount of Lewis base which is required to produce this selective fluorination varies according to the relative reactivity of the various carbonyl functions present in the steroid molecule. Generally speaking, the amount of Lewis base to be added to the reaction mixture lies within the range of about 0.1 mole to about 0.9 mole per mole of Lewis acid present in the reaction mixture.

When the steroid starting material contains more than one carbonyl function and it is only desired to fluorinate one of these functions, an alternative manner of achieving selective fluorination involves the use of chemical blocking groups to prevent fluorination at other than the desired site. For example, where the starting steroid contains the cortical side chain in addition to the carbonyl function to be fluorinated, the cortical side chain can be blocked by means known in the art, for example, by conversion to the bismethylenedioxy derivative before subjecting the steroid to the process of the invention. After the fluorination has been accomplished, the side chain is then removed by means known in the art to obtain the desired product.

It is to be noted that where the starting steroid contains a free hydroxyl group in addition to the carbonyl function or functions to be fluorinated, this free hydroxyl group must be protected, for example, by acylation otherwise it will be attacked by the reagent. After the fluorination has been accomplished, the protecting group on the hydroxyl can be removed, if desired, by means known in the art, for example, by hydrolysis where the protecting group is acyl, to regenerate the free hydroxyl group.

Where the starting steroid contains two or more carbonyl functions having different orders of activity, it is often possible to fluorinate selectively the most active carbonyl function without resorting to the use of blocking groups or the addition of Lewis bases to the reaction mixture. For example, using the simple, unmodified conditions of the process of the invention, it is possible to fluorinate selectively a 20-keto group in the presence of a Δ⁴-3-keto group; similarly a 20-keto group and/or a 3-keto group can be fluorinated selectively in a molecule which also contains an 11-keto group.

The process of the invention is of general application and can be applied to any steroid containing one or more carbonyl functions present in the form of aldehyde, carboxy, haloformyl or formyl groups. The process of the invention gives rise to fluorosteroids many of which are novel and many of which could not be produced readily by methods hitherto known. The fluorosteroids which can be produced by the process of the invention possess valuable therapeutic activity or are intermediates in the preparation of steroids which themselves possess therapeutic activity. Thus the fluorosteroids which can be produced by the process of the invention can be used in the treatment of inflammatory diseases, the management of disturbances in salt and water balance in the body, in corrective therapy in the malfunction of the adrenal gland, in the treatment of abnormal mental and central nervous system behavior, in treating disturbances in carbohydrate and protein metabolism, in regulating the excretion of corticotrophin and gonadotrophin, and in the treatment of circulatory diseases. Illustratively, the compounds lithocholic acid fluoride and the corresponding 3-acylates, for example, the 3-acetate, 24,24,24-trifluoro-5β-cholan-3α-ol and the corresponding 3-acylates, for example, the 3-acetate, 17,17-difluoro-Δ⁴-androsten-3-one, 17,17-difluoro-Δ¹-androstene-3,11-dione, 6α-difluoromethyl-5α-androstene-3β,17β-diol and the corresponding 3,17-diacylates, for example, the 3,17-diacetate, 2-difluoromethyltestosterone and the corresponding 17-acylates, for example, the 17-acetate, and 20,20-difluoropregnan-11-one possess serum-cholesterol lowering activity. The compounds named above and also 3,3-difluorocholestane exhibit central nervous system depressant activity and can be used as sedatives and general anesthetics in mammals. For example, they can be used as sedatives and anesthetics in the laboratory manipulation of experimental animals such as mice and rats. The compounds 6α-difluoromethyl-5α-androstane-3β,17β-diol and the corresponding 3,17-diacylates, for example, the 3,17-diacetate, 2-difluoromethyltestosterone and the corresponding 17-acylates, for example, the 17-acetate, and 20,20-difluoropregnan-11-one also exhibit activity as anti-fertility agents and can be used to control fertility in ovulating mammals and birds, for example, in animals such as swine, cattle, horses, sheep, dogs, cats, and the like. The compounds 6α-difluoromethyl-5α-androstane-3β,17β-diol and the corresponding 3,17-diacylates, for example, the 3,17-diacetate, and 2-difluoromethyltestosterone and the corresponding 17-acylates, for example, the 17-acetate, also exhibit anabolic-androgenic activity and because of their anabolic activity, are useful in increasing weight, muscle strength, and for increasing the sense of well-being and for positive nitrogen balance in pituitary deficiencies.

The novel compounds produced by the process of the invention, when used in therapy, can be administered to animals, birds, and the like, in a wide variety of oral or parenteral dosage forms singly or in admixture with other active compounds. They can be associated with a pharmaceutical carrier which can be solid material or a liquid in which the compound is dissolved, dispersed, or suspended. The solid compositions can take the form of tablets, powders, capsules, pills, or the like, preferably in unit dosage forms for simple administration or precise dosages. The liquid compositions can take the form of solutions, emulsions, suspension, syrups or elixirs.

The following examples are illustrative of the process and products of the present invention, but are not to be construed as limiting.

EXAMPLE 1

*24,24,24-trifluoro-5β-cholan-3α-ol, acetate*

A mixture of 1.0 g. (0.0024 mole) of lithocholic acid acetate, 0.75 ml. (0.042 mole) of water and 20 ml. of methylene chloride was charged into a 100 ml. capacity stainless steel autoclave. The autoclave was sealed and cooled in a bath of Dry Ice and acetone while a total of 46 g. (0.43 mole) of sulfur tetrafluoride was passed into the autoclave. The contents of the autoclave were then agitated for 16 hr. at a temperature of 20° C. before being diluted with methylene chloride and washed with an excess of aqueous potassium bicarbonate solution. The washed methylene chloride solution was dried over anhydrous sodium sulfate, and the dried solution was filtered. The filtrate was evaporated to dryness and the residue was chromatographed on a column containing 60 g. of Florisil (synthetic magnesium silicate). The column was eluted with Skellysolve B (a mixture of hexanes) and Skellysolve B containing increasing proportions of acetone. The eluate containing 1% acetone was evaporated to dryness and the residue (0.43 g.) was recrystallized twice from a mixture of acetone and water. There was thus obtained 24,24,24-trifluoro-5β-cholan-3α-ol acetate in the form of a crystalline solid having a melting point of 148 to 150° C.; [α]_D +44° (chloroform).

*Analysis.*—Calcd. for $C_{26}H_{41}O_2F_3$: C, 70.55; H, 9.34; F, 12.88. Found: C, 70.77; H, 9.49; F, 12.53.

EXAMPLE 2

*Lithocholic acid fluoride acetate*

A mixture of 1.0 g. (0.0024 mole) of lithocholic acid acetate, 0.75 ml. (0.042 mole) of water and 20 ml. of tetramethylene sulfone was charged into a 100 ml. capacity stainless steel autoclave. The autoclave was sealed and cooled in a bath of Dry Ice and acetone while a total of 46 g. (0.43 mole) of sulfur tetrafluoride was passed into the autoclave. The contents of the autoclave were then agitated for 16 hr. at a temperature of 20° C. before being diluted with methylene chloride and washed with an excess of aqueous potassium bicarbonate solution. The washed methylene chloride solution was dried over anhydrous sodium sulfate, and the dried solution was filtered. The filtrate was evaporated on the steam bath leaving a suspension of solid in tetramethylene sulfone. The suspension was diluted with water and the solid was isolated by filtration, washed with water, and dried. The material (0.82 g.; melting point 152 to 155° C.) so obtained was recrystallized twice from a mixture of acetone and water. There was thus obtained lithocholic acid fluoride acetate in the form of a crystalline compound having a melting point of 156 to 158° C. The infrared absorption spectrum of the compound (mineral oil mull) exhibited maxima at 1845 and 1735 reciprocal centimeters.

*Analysis.*—Calcd. for $C_{26}H_{41}O_3F$: C, 74.24; H, 9.83; F, 4.52. Found: C, 73.65; H, 9.90; F, 5.08.

EXAMPLE 3

*3,3-difluorocholestane*

A mixture of 1 g. (0.0026 mole) of cholestan-3-one, 0.75 ml. (0.042 mole) of water, and 20 ml. of methylene chloride was charged into a 100 ml. capacity stainless steel autoclave. The autoclave was sealed and cooled in a bath of Dry Ice and acetone and a total of 46 g. (0.43 mole) of sulfur tetrafluoride was passed into the autoclave. The contents of the autoclave were then agitated for 16 hr. at a temperature of 15° C. before being diluted with methylene chloride and washed with aqueous potassium bicarbonate solution. The methylene dichloride solution was dried over anhydrous sodium sulfate and filtered. The filtrate was evaporated to dryness and the residue was recrystallized from acetone. There was thus obtained 0.82 g. of 3,3,-difluorocholestane in the form of a crystalline solid having a melting point of 109 to 110° C. A sample of this material was recrystallized several times from acetone for analytical purposes to give material having a melting point of 109.5 to 111° C.; [α]_D +22° (chloroform).

*Analysis.*—Calcd. for $C_{27}H_{46}F_2$: C, 79.35; H, 11.35; F, 9.30. Found: C, 79.55; H, 11.39; F, 9.89.

EXAMPLE 4

3,3-difluorocholestane

Using the procedure described in Example 3, but reducing the amount of water employed in the reaction mixture to 0.05 ml. (0.0028 mole), there was obtained 0.78 g. of 3,3-difluorocholestane having a melting point of 105 to 107° C.

EXAMPLE 5

3,3-difluoroandrostan-17β-ol acetate

A mixture of 5 g. (0.015 mole) of androstan-17β-ol-3-one acetate, 0.75 ml. (0.042 mole) of water, and 20 ml. of methylene dichloride was charged into a 100 ml. capacity stainless steel autoclave. The autoclave was sealed and cooled in a bath of Dry Ice and acetone and a total of 46 g. (0.43 mole) of sulfur tetrafluoride was passed into the autoclave. The contents of the autoclave were agitated for 16 hr. at a temperature of 15° C. before being diluted with methylene chloride and washed with aqueous potassium bicarbonate solution. The methylene chloride solution was dried over anhydrous sodium sulfate and filtered. The filtrate was evaporated to dryness and the residue was chromatographed on a column of magnesium silicate (Florisil). The column was eluted with Skellysolve B and Skellysolve B containing increasing proportions of methylene chloride. The eluate containing 50% methylene chloride was evaporated to dryness and the residue was recrystallized from a mixture of acetone and water. There was thus obtained 4.35 g. of 3,3-difluoroandrostan-17β-ol acetate in the form of a crystalline solid having a melting point of 132 to 134° C. An analytical sample having a melting point of 136.5 to 138° C. and $[\alpha]_D$ +2° (chloroform) was obtained by further recrystallization from an acetone-water mixture.

*Analysis.*—Calcd. for $C_{21}H_{32}O_2F_2$: C, 71.15; H, 9.10; F, 10.72. Found: C, 71.08; H, 9.39; F, 10.37.

EXAMPLE 6

17,17-difluoro-Δ⁴-androstene-3-one

A mixture of 1 g. (0.0035 mole) of Δ⁴-androstene-3,17-dione, 0.75 ml. (0.042 mole) of water, and 20 ml. of methylene chloride was charged into a 100 ml. capacity stainless steel autoclave. The autoclave was sealed and cooled in a bath of Dry Ice and acetone while a total of 46 g. (0.43 mole) of sulfur tetrafluoride was passed into the autoclave. The contents of the autoclave were then agitated for 16 hr. at a temperature of 15° C. before being diluted with methylene chloride and washed with an excess of aqueous potassium bicarbonate solution. The washed methylene chloride solution was dried over anhydrous sodium sulfate, and the dried solution was filtered. The filtrate was evaporated to dryness and the residue was chromatographed on a column of magnesium silicate (Florisil). The column was eluted with Skellysolve B and Skellysolve B containing increasing proportions of acetone. The eluate containing 2% acetone was evaporated to dryness and the residue (0.78 g.) was recrystallized from a mixture of acetone and water. There was thus obtained 0.59 g. of 17,17-difluoro-Δ⁴-androstene-3-one in the form of a crystalline solid having a melting point of 185 to 187° C.; $[\alpha]_D$ +97° (chloroform). The ultraviolet absorption spectrum of the compound (in solution in ethanol) exhibited a maximum at 240 millimicrons.

*Analysis.*—Calcd. for $C_{19}H_{26}OF_2$: C, 73.99; H, 8.50; F, 12.32. Found: C, 74.19; H, 8.78; F, 12.20.

When the above procedure was repeated using only 0.05 ml. (0.0028 mole) of water the only detectable product was unchanged Δ⁴-androstene-3,17-dione.

EXAMPLE 7

17,17-difluoro-Δ¹-androstene-3,11-dione and 3,3,17,17-tetrafluoro-Δ¹-androstene-11-one A mixture of 1 g. (0.0033 mole) of Δ¹-androstene-3,11,17-trione, 0.75 ml. (0.042 mole) of water and 20 ml. of methylene chloride was charged into a 100 ml. capacity stainless steel autoclave. The autoclave was sealed and cooled in a bath of Dry Ice and acetone while a total of 46 g. (0.43 mole) of sulfur tetrafluoride was passed into the autoclave. The contents of the autoclave were then agitated for 16 hr. at 15° C. before being diluted with methylene chloride and washed with an excess of aqueous potassium bicarbonate solution. The washed methylene chloride solution was dried over anhydrous sodium sulfate, and the dried solution was filtered. The filtrate was evaporated to dryness and the residue was chromatographed on a column of magnesium silicate (Florisil). The column was eluted with Skellysolve B and Skellysolve B containing increasing proportions of acetone. The eluate obtained using 1% acetone in Skellysolve B was evaporated to dryness and the residue was recrystallized twice from aqueous methanol. There was obtained 24 mg. of 3,3,17,17-tetrafluoro-Δ¹-androstene-11-one in the form of a crystalline solid having a melting point of 144 to 145° C. The eluate obtained using from 2% to 7% acetone in Skellysolve B was evaporated to dryness and the residue was recrystallized from acetone and Skellysolve B. There was thus obtained 0.708 g. of 17,17-difluoro-Δ¹-androstene-3,11-dione in the form of a crystalline solid having a melting point of 123 to 126° C. An analytical sample having a melting point of 126 to 127° C. and $[\alpha]_D$ +86° (chloroform) was obtained by a further recrystallization from the same solvent mixture. The ultraviolet absorption spectrum of this material (in solution in ethanol) exhibited a maximum at 226 millimicrons.

*Analysis.*—Calcd. for $C_{19}H_{24}O_2F_2$: C, 70.78; H, 70.50; F, 11.79. Found: C, 70.84; H, 7.95; F, 12.30.

EXAMPLE 8

20,20-difluoroprogesterone

A mixture of 1 g. (0.0032 mole) of progesterone, 0.75 ml. (0.042 mole) of water, and 20 ml. of methylene chloride was charged into a 100 ml. capacity stainless steel autoclave. The autoclave was sealed and cooled in a bath of Dry Ice and acetone while a total of 46 g. (0.43 mole) of sulfur tetrafluoride was passed into the autoclave. The contents of the autoclave were then agitated for 16 hr. at 15° C. before being diluted with methylene chloride and washed with an excess of aqueous potassium bicarbonate solution. The washed methylene chloride solution was dried over anhydrous sodium sulfate, and the dried solution was filtered. The filtrate was evaporated to dryness and the residue was chromatographed on a column of magnesium silicate. The column was eluted with Skellysolve B and Skellysolve B containing increasing proportions of acetone. The eluate containing 2% acetone was evaporated to dryness and the residue (0.35 g.) was recrystallized from a mixture of acetone and water. There was thus obtained 0.28 g. of 20,20-difluoroprogesterone in the form of a crystalline solid having a melting point of 112 to 114° C. An analytical sample having a melting point of 116 to 116.5° C. and $[\alpha]_D$ +98° (chloroform) was obtained by further recrystallization from a mixture of acetone and water. The ultraviolet absorption spectrum of this material (in solution in ethanol) exhibited a maximum at 241 millimicrons.

*Analysis.*—Calcd. for $C_{21}H_{30}OF_2$: C, 74.96; H, 9.20; F, 11.29. Found: C, 75.30; H, 9.32; F, 10.95.

EXAMPLE 9

6α-difluoromethyl-5α-androstane-3β,17β-diol diacetate

A mixture of 0.49 g. (0.0012 mole) of 6α-formyl-5α- androstane-3β,17β-diol diacetate, 0.75 ml. (0.042 mole) of water, and 20 ml. of methylene chloride was charged into a 100 ml. capacity stainless steel autoclave. The autoclave was sealed and cooled in a bath of Dry Ice and acetone while a total of 46 g. (0.43 mole) of sulfur tetrafluoride was passed into the autoclave. The contents of the autoclave were then agitated for 16 hr. at a temperature of 15° C. before being diluted with methylene chloride and washed with an excess of aqueous potassium bicarbonate solution. The washed methylene chloride solution was dried over anhydrous sodium sulfate and filtered. The filtrate was evaporated to dryness and the residue was chromatographed on a column of magnesium silicate (Florisil). The column was eluted with Skellysolve B and Skellysolve B containing increasing proportions of acetone. The eluate containing 1% and 2% acetone was evaporated to dryness. The residue (0.34 g.) was recrystallized from a mixture of acetone and water. There was thus obtained 0.26 g. of 6α-difluoromethyl-5α-androstane-3β,17β-diol diacetate in the form of a crystalline solid having a melting point of 150 to 151° C. An analytical sample having a melting point of 151 to 152° C. and $[\alpha]_D$ +10° (chloroform) was obtained by two further recrystallizations from a mixture of acetone and water.

Analysis.—Calcd. for $C_{24}H_{36}O_4F_2$: C, 67.58; H, 8.51; F, 8.91. Found: C, 67.51; H, 8.46; F, 8.97.

The 6α-formyl-5α-androstane-3β,17β-diol diacetate employed as starting material in the above preparation was prepared in the following manner:

A solution of 5 g. of Δ⁵-androstene-3β,17β-diol in 10 ml. of pyridine and 5 ml. of acetic anhydride was prepared by warming the mixture briefly. The solution was allowed to stand overnight at approximately 25° C. before being treated with excess aqueous potassium bicarbonate solution. The solid which separated was isolated by filtration, washed with water and dried in vacuo. There was thus obtained 6.35 g. of Δ⁵-androstene-3β,17β-diol diacetate in the form of a crystalline solid having a melting point of 153 to 155° C.

An autoclave was charged with 6.2 g. of Δ⁵-androstene-3β,17β-diol diacetate (obtained as described above), 200 ml. of toluene and 1.5 g. of cobalt carbonate. After flooding the autoclave three times with carbon monoxide, the carbon monoxide pressure was raised to 650 pounds per square inch, and hydrogen was introduced until the gas pressure reached 1360 pounds per square inch. The reaction mixture in the autoclave was heated at 180° C. with agitation for a period of about 18 hrs. The gases were vented and the reaction mixture was removed from the autoclave and filtered through Celite (diatomaceous earth). The filtered solids were washed with benzene and the filtrate plus washings were evaporated to dryness. The residue was heated under reflux with absolute ethanol for 1 hr. and the resulting mixture was filtered through Celite. The filtrate was evaporated to dryness under reduced pressure and the semicrystalline residue was chromatographed on a column of 350 g. of aluminum silicate (Florisil). The column was eluated with Skellysolve B and Skellysolve B containing increasing proportions of acetone. The eluate containing 5% and 10% acetone was evaporated to dryness. The residue was recrystallized from a mixture of acetone and Skellysolve B. There was thus obtained 4.91 g. of 6-hydroxymethyl-5α-androstane-3β,17β-diol diacetate in the form of a crystalline solid have a melting point of 190 to 191° C. An analytical sample having a melting point of 192.5 to 194° C. and $[\alpha]_D$ +3° (chloroform) was obtained by further recrystallization from a mixture of acetone and Skellysolve B.

Analysis.—Calcd. for $C_{24}H_{38}O_5$: C, 70.90; H, 9.42. Found: C, 71.03; H, 9.45.

To a slurry of 1.12 g. of chromic acid in 12 ml. of pyridine was added a solution of 2 g. of 6-hydroxymethyl-5α-androstane-3β,17β-diol diacetate (prepared as described above) in 6 ml. of pyridine. Two portions of 2 ml. of pyridine were used to rinse the steroid into the chromic acid complex. The flask was swirled, the air was displaced with nitrogen, and the stoppered flask was allowed to stand in the dark for 5 hrs. The resulting mixture was diluted with ethyl acetate and water, the layers were separated, and the aqueous layer was extracted with ethyl acetate. The combined organic layer and extracts were filtered, washed with water and with aqueous potassium bicarbonate solution, and dried over anhydrous sodium sulfate. The dried solution was filtered and the filtrate was evaporated to dryness. The residue was dissolved in a small quantity of methylene dichloride and chromatographed on a column of neutral alumina (Grade III). The column was eluted with Skellysolve B and the eluate was evaporated to dryness. The residue was recrystallized from a mixture of methylene chloride and Skellysolve B. There was thus obtained 0.55 g. of 6α-formyl-5α-androstane-3β,17β-diol diacetate in the form of a crystalline solid having a melting point of 114 to 118° C. The infrared spectrum of the compound was consistent with the assigned structure.

EXAMPLE 10

*17:20,20:21-bismethylenedioxy-3β-acetoxy-6α-difluoromethyl-5α-pregnane-11-one*

A mixture of 0.95 g. (0.002 mole) of 17:20,20:21-bismethylenedioxy - 3β - acetoxy-6α-formylpregnane-11-one, 0.05 ml. (0.0028 mole) of water, 0.25 ml. (0.0031 mole) of tetrahydrofuran, and 20 ml. of methylene chloride was charged into a 100 ml. capacity stainless steel autoclave. The autoclave was sealed and cooled in a bath of Dry Ice and acetone while a total of 46 g. (0.43 mole) of sulfur tetrafluoride was passed into the autoclave. The contents of the autoclave were then agitated for 16 hrs. at 15° C. before being diluted with methylene chloride and washed with an excess of aqueous potassium bicarbonate solution. The washed methylene chloride solution was dried over anhydrous sodium sulfate and the dried solution was filtered. The filtrate was evaporated to dryness and the residue was chromatographed on a column of magnesium silicate (Florisil). The column was eluted with Skellysolve B and Skellysolve B containing increasing proportions of acetone. The eluate containing 2% to 4% acetone was evaporated to dryness. Crystalline residues melting between 232 and 238° C. were combined and recrystallized from a mixture of acetone and Skellysolve B. There was thus obtained 0.59 g. of 17:20,20:21-bismethylenedioxy-3β-acetoxy-6α-difluoromethyl-5α-pregnane-11-one in the form of a crystalline solid having a melting point of 233 to 238° C. An analytical sample having a melting point of 238 to 242° C. and $[\alpha]_D$ −40° (chloroform) was obtained by further recrystallization from a mixture of acetone and Skellysolve B.

Analysis.—Calcd. for $C_{26}H_{36}O_7F_2$: C, 62.63; H, 7.28; F, 7.62. Found: C, 62.38; H, 7.11; F, 7.44.

The 17:20,20:21 - bismethylenedioxy - 3β-acetoxy-6α-formyl-5α-pregnane-11-one employed as starting material in the above procedure was prepared in the following manner:

A mixture of 200 g. of 4-pregnene-17α,21-dihydroxy-3,11,20-trione (cortisone), 4000 ml. of chloroform, 2500 ml. of 38% aqueous formaldehyde and 2000 ml. of concentrated hydrochloric acid was stirred at room temperature for a period of about 20 hrs. The chloroform layer was separated, washed twice with water, sodium bicarbonate solution and again with water. The chloroform extract was dried with sodium sulfate, the solvent evaporated and the residue crystallized from methanol to give 136 g. of light colored crystalline solid 17:20,20:21-bismethylenedioxy-4-pregnene-3,11-dione with a melting point of 244 to 248° C. and $[\alpha]_D$ +82° (chloroform).

85.9 g. of the 17:20,20:21-bismethylenedioxy-4-pregnene-3,11-dione so obtained, 750 ml. of isopropenyl acetate, 2.5 g. of p-toluenesulfonic acid monohydrate and 1000 ml. of toluene were placed in a 3 liter flask fitted with a stirrer, heating mantle and condenser. The heating of the mixture was regulated so that 200 ml. of distillate was collected over a 2 hour period. An additional 500 ml. of toluene and 750 ml. of isopropenyl acetate was added and 1200 ml. of distillate collected over a 4 hour period. The reaction mixture was then concentrated to a volume of about 200 ml. on a water bath held at a temperature of 70 to 80° C. 1000 ml. more of toluene was added and the solution concentrated to a volume of about 200 ml. under vacuum. Benzene was added to the residue and the organic solution washed first with 5% aqueous sodium bicarbonate solution, then water and dried with sodium sulfate. The benzene solution was stirred with 40 g. each of Florisil and Magnesol (synthetic magnesium silicates) for a period of about 1 hour and then filtered. Evaporation of the solvent and crystallization of the resulting residue gave 48.1 g. (51% yield) of 17:20,20:21-bismethylenedioxy-3,5-pregnadien-11-one 3-acetate with a melting point of 170–182° C. 70 g. of the latter compound, prepared in this manner, was dissolved in 1750 ml. of dioxane and the resulting solution cooled to 0° to 5° C. To this solution, over a period of 30 minutes, 70 g. of sodium borohydride dissolved in 700 ml. of 0.1 N sodium hydroxide was added. After a period of about 50 hours at room temperature, the excess sodium borohydride was decomposed by the addition of 50% aqueous acetic acid. 900 ml. of water was added and after prolonged cooling at 0° C. the product was collected by filtration, washed with water and dried. This solid was suspended in 500 ml. of pyridine, warmed to 30° C. and filtered. 150 ml. of acetic anhydride was added to the filtrate and the reaction mixture heated on a steam bath for about 1.5 hours. After cooling, the solution was poured into 3000 ml. of ice water, allowed to stand at 0 to 5° C., collected by filtration, washed and dried to give 52.68 g. (74% yield) of 17:20,20:21-bismethylenedioxy-5-pregnene-3$\beta$,11$\beta$-diol 3-acetate with a melting point of 187 to 195° C. Two recrystallizations from acetone and Skellysolve B (hexanes) raised the melting point to 198 to 199° C.

*Analysis.*—Calcd. for $C_{25}H_{36}O_7$: C, 66.94; H, 8.09. Found: C, 66.75; H, 7.99.

A 2000 ml. autoclave was charged with 36.4 g. of the 17:20,20:21-bismethylenedioxy-5-pregnene-3$\beta$,11$\beta$-diol 3-acetate so obtained, 1150 ml. of toluene and 9.1 g. of cobalt carbonate. After flushing the autoclave three times with carbon monoxide, the carbon monoxide pressure was raised to 650 pounds per square inch, and hydrogen was introduced until the gas pressure reached 1360 pounds per square inch. The reaction mixture in the autoclave was heated at 180° C. with agitation for a period of about 18 hours. The gases were vented and the reaction mixture removed from the autoclave. Following filtration through Celite (diatomaceous earth) the toluene was evaporated in vacuo and the residue boiled for 1 hour in 1000 ml. of ethanol. The solution was filtered through Celite and the alcohol evaporated in vacuo. Crystallization of the residue from a mixture of acetone and Skellysolve B gave 15.8 g. (Crop 1) of 17:20,20:21 - bismethylenedioxy - 6$\alpha$ - hydroxymethyl-5$\alpha$-pregnane-3$\beta$,11$\beta$-diol 3-acetate (V) with a melting point of 193 to 199° C. The mother liquors were chromatographed on a column of synthetic magnesium silicate, and eluted with acetone: Skellysolve B mixtures of increasing polarity. Elution with 20–30% acetone: Skellysolve B gave an additional amount of 17:20,20:21-bismethylenedioxy - 6$\alpha$ - hydroxymethyl - 5$\alpha$ - pregnane-3$\beta$,11$\beta$-diol 3-acetate. Crystallization of the combined fractions from acetone:Skellysolve B gave a further 4.9 g. (Crop 2) of product with a melting point of 193 to 199° C. Two crystallizations from acetone:Skellysolve B yielded purified 17:20,20:21-bismethylenedioxy-6$\alpha$-hydroxymethyl-5$\alpha$-pregnane-3$\beta$,11$\beta$-diol 3-acetate having a melting point of 202 to 204° C.

*Analysis.*—Calcd. for $C_{26}H_{40}O_8$: C, 64.98; H, 8.39. Found: C, 64.63; H, 8.65.

To a solution of 10 g. of the 17:20,20:21-bismethylenedioxy-6$\alpha$-hydroxymethyl-5$\alpha$-pregnane-3$\beta$,11$\beta$-diol 3-acetate so obtained in 100 ml. of pyridine was added a solution of chromic acid-pyridine complex prepared from 10 g. of chromic acid and 100 ml. of pyridine. The mixture was allowed to stand for 18 hrs. at approximately 25° C. before being decomposed by the addition of water and equal parts of benzene and ether. The resulting mixture was filtered and the organic layer from the filtrate was separated. The aqueous layer was extracted twice with a mixture of benzene and ether and the combined organic layer and extracts were washed successively with sodium bicarbonate solution and water before being dried over anhydrous sodium sulfate. The dried solution was filtered and the filtrate was evaporated to dryness. The residue was dissolved in 200 ml. of toluene and the solution was evaporated to dryness. The latter operation was repeated twice. The residue was dissolved in 25 ml. of methylene chloride and chromatographed on a column of 900 g. of magnesium silicate (Florisil). The column was eluted with Skellysolve B and Skellysolve B containing increasing proportions of acetone. The eluate containing 20% acetone was evaporated to dryness. The residue was recrystallized from a mixture of acetone and Skellysolve B. There was thus obtained 2.48 g. of 17:20,20:21-bismethylenedioxy-3$\beta$-acetoxy-6$\alpha$-formyl-5$\alpha$-pregnane-11-one in the form of a crystalline solid having a melting point of 212 to 220° C.

*Analysis.*—Calcd. for $C_{26}H_{36}O_8$: C, 65.53; H, 7.61. Found: C, 65.19; H, 7.69.

EXAMPLE 11

*2-difluoromethyltestosterone 17-acetate*

A mixture of 1 g. (0.0028 mole) of 2-hydroxymethylenetestosterone 17-acetate, 0.75 ml. (0.042 mole) of water and 20 ml. of methylene chloride was charged into a 100 ml. capacity stainless steel autoclave. The autoclave was sealed and cooled in a bath of Dry Ice and acetone while a total of 46 g. (0.43 mole) of sulfur tetrafluoride was passed into the autoclave. The contents of the autoclave were then agitated for 16 hrs. at 15° C. before being diluted with methylene chloride and washed with an excess of aqueous potassium bicarbonate solution. The washed methylene chloride solution was dried over anhydrous sodium sulfate, and the dried solution was filtered. The filtrate was evaporated to dryness and the residue was chromatographed on a column of magnesium silicate (Florisil). The column was eluted with Skellysolve B and Skellysolve B containing increasing proportions of acetone. The eluate containing 3 to 4% acetone was evaporated to dryness. The residue was recrystallized several times from a mixture of acetone and Skellysolve B. There was thus obtained 2-difluoromethyltestosterone 17-acetate in the form of a crystalline solid having a melting point of 179 to 180° C.; $[\alpha]_D$ +93° (chloroform). The ultraviolet absorption spectrum of the compound (in ethanol solution) exhibited a maximum at 241 millimicrons.

*Analysis.*—Calcd. for $C_{22}H_{30}O_3F_2$: F, 9.99. Found: F, 9.97.

The 2-hydroxymethylenetestosterone 17-acetate employed as starting material in the above procedure was prepared in the following manner:

A homogeneous mixture of 7 g. of 2-hydroxymethylenetestosterone (Weisenborn et al. J. Amer. Chem. Soc., 76, 552, 1954), 8 ml. of acetic anhydride and 40 ml. of anhydrous pyridine was allowed to stand overnight under a nitrogen atmosphere. The mixture was then treated with 2 ml. of water and stirred for 1 hr. before being poured into a cold mixture of 50 ml. of concentrated hydrochloric acid and 500 ml. of water. The product was extracted immediately with benzene and the benzene extract was washed successively with water, dilute sodium hydroxide solution and water before being dried over anhydrous sodium sulfate. The dried solution was filtered and the filtrate was evaporated to dryness. The residue was dissolved in 100 ml. of absolute methanol and to the solution so obtained was added a solution of 5 g. of potassium bicarbonate in 20 ml. of water. The resulting mixture was stirred for 1 hour when 15 ml. of water was added and the stirring was continued for a further 1 hour. The mixture so obtained was diluted with 1 l. of cold water and then acidified by the addition of a solution of 15 ml. of concentrated hydrochloric acid in 50 ml. of water. The product was extracted immediately with ether and the ether extract was washed quickly with four 75 ml. portions of water before being dried over anhydrous sodium sulfate. The dried extract was filtered and the filtrate was concentrated to a small volume and allowed to crystallize. There was thus obtained a total of 5.9 g. of 2-hydroxymethylenetestosterone 17-acetate in the form of a crystalline solid having a melting point of 163 to 166° C. An analytical sample having a melting point of 164.5 to 165.5° C. and $[\alpha]_D$ +16° (chloroform) was obtained by recrystallization from ether.

*Analysis.*—Calcd. for $C_{22}H_{30}O_4$: C, 73.71; H, 8.44. Found: C, 73.72; H, 8.47.

EXAMPLE 12

*20,20-difluoro-11-ketoprogesterone*

Using the procedure described in Example 8, but substituting 11-ketoprogesterone for progesterone, there was obtained 20,20-difluoro-11-ketoprogesterone in the form of a crystalline solid having a melting point of 153 to 159° C.

*Analysis.*—Calcd. for $C_{21}H_{28}O_2F_2$: C, 71.97; H, 8.05; F, 10.84. Found: C, 72.51; H, 8.13; F, 11.35.

EXAMPLE 13

*20,20-difluoropregnane-11-one*

Using the procedure described in Example 8, but substituting pregnane-11,20-dione for progesterone, there was obtained 20,20-difluoropregnane-11-one in the form of a crystalline solid having a melting point of 153 to 156.5° C.

*Analysis.*—Calcd. for $C_{21}H_{32}OF_2$: C, 74.74; H, 9.53; F, 11.26. Found: C, 74.32; H, 9.48; F, 11.38.

EXAMPLE 14

*20,20-difluoro-5β-pregnan-3α-ol acetate*

Using the procedure described in Example 8, but substituting 5β-pregnan-3α-ol-20-one acetate for progesterone, there was obtained 20,20-difluoro-5β-pregnan-3α-ol acetate in the form of a crystalline solid having a melting point of 90 to 91.5° C.

*Analysis.*—Calcd. for $C_{23}H_{34}O_3F_2$: C, 72.21; H, 9.49; F, 9.93. Found: C, 73.32; H, 9.65; F, 10.23.

EXAMPLE 15

*20,20-difluoropregnane-3α-ol-11-one acetate*

Using the procedure described in Example 8, but substituting pregnane-3α-ol-11,20-dione acetate for progesterone, there was obtained 20,20-difluoropregnane-3α-ol-11-one acetate in the form of a crystalline solid having a melting point of 139 to 140.5° C.

*Analysis.*—Calcd. for $C_{23}H_{30}O_4F_2$: C, 69.66; H, 8.64; F, 9.58. Found: C, 69.57; H, 8.56; F, 10.15.

EXAMPLE 16

*24,24,24-trifluoro-5β-cholan-3α-ol acetate*

Using the procedure described in Example 1, but substituting lithocholic acid fluoride acetate (prepared as described in Example 1) for lithocholic acid acetate, there is obtained 24,24,24-trifluoro-5β-cholan-3α-ol acetate.

We claim:

1. A process for the preparation of a difluoromethylsteriod which comprises reacting a formylsteroid with sulfur tetrafluoride in the presence of a Lewis acid and an inert solvent at a temperature within the range of about 0° C. and about 100° C., said Lewis acid being present in the proportion of at least 1 mole per mole of formylsteroid for each formyl group in the latter to be fluorinated whereby the oxygen of the formyl group in the starting steroid is replaced by two fluorine atoms.

2. A process for the preparation of a difluoromethylsteriod which comprises reacting a formylsteroid with sulfur tetrafluoride in the presence of a Lewis acid and an inert solvent at a temperature within the range of about 0° C. and about 100° C., said Lewis acid being present in the proportion of at least 1 mole per mole of formylsteroid for each formyl group in the latter to be fluorinated, and said sulfur tetrafluoride being present in the proportion of at least 2 moles per mole of formylsteroid for each formyl group in the latter to be fluorinated.

3. A process for the preparation of a difluoromethylsteriod which comprises reacting a formylsteroid with sulfur tetrafluoride in the presence of hydrogen fluoride and an inert solvent at a temperature within the range of about 0° C. and about 100° C., said hydrogen fluoride being present in the proportion of about 1.3 mole to about 20 moles per mole of formylsteroid for each formyl group in the latter to be fluorinated, said sulfur tetrafluoride being present in the proportion of about 13 moles to about 100 moles per mole of formylsteroid for each formyl group in the latter to be fluorinated, and the mole ratio of sulfur tetrafluoride to hydrogen fluoride being within the range of about 1:0.01 to about 1:3 whereby the oxygen of the formyl group in the starting steroid is replaced by two fluorine atoms.

4. The process of claim 3 wherein the hydrogen fluoride is generated in situ in the reaction mixture by incorporating in the latter an amount of water in the proportion of 0.5 mole of water per mole of hydrogen fluoride to be generated.

5. A process for the preparation of a trifluoromethyl steroid which comprises reacting a steroid selected from the class consisting of a steroid carboxylic acid and the corresponding acid halide thereof with sulfur tetrafluoride in the presence of a Lewis acid and an inert solvent at a temperature within the range of about 0° C. and about 100° C., said Lewis acid being present in the proportion of at least 1 mole per mole of steroid starting material for each carbonyl function in the latter to be fluorinated whereby the carboxylic acid function in the starting steriod is converted to trifluoromethyl.

6. A process for the preparation of a trifluoromethyl steroid which comprises reacting a steroid selected from the class consisting of a steroid carboxylic acid and the corresponding acid halide thereof with sulfur tetrafluoride in the presence of a Lewis acid and an inert solvent at a temperature within the range of about 0° C. and about 100° C., said Lewis acid being present in the proportion of at least 1 mole per mole of steroid starting material for each carbonyl function in the latter to be fluorinated, and the sulfur tetrafluoride being present in the proportion of at least 2 moles per mole of steroid starting material for each carbonyl function in the latter to be fluorinated whereby the carboxylic acid function in the starting steroid is converted to trifluoromethyl.

7. A process for the preparation of a trifluoromethyl steroid which comprises reacting a steroid selected from the class consisting of a steroid carboxylic acid and the corresponding acid halide thereof in the presence of hydrogen fluoride and an inert solvent at a temperature within the range of about 0° C. and about 100° C., the hydrogen fluoride being present in the proportion of about 1.3 moles to about 20 moles per mole of steroid starting material for each carbonyl function in the latter to be fluorinated, the sulfur tetrafluoride being present in the proportion of about 13 moles to about 100 moles per mole of steroid starting material for each carbonyl function in the latter to be fluorinated, and the mole ratio of sulfur tetrafluoride to hydrogen fluoride being within the range of about 1:0.01 to about 1:3 whereby the carboxylic acid function in the starting steroid is converted to trifluoromethyl.

8. The process of claim 7 wherein the hydrogen fluoride is generated in situ in the reaction mixture by incorporating in the latter an amount of water in the proportion of 0.5 mole of water per mole of hydrogen fluoride to be generated.

9. A process for selectively fluorinating a formyl group present in a steroid which also contains a keto group to form the corresponding difluoromethylsteroid, which comprises reacting said steroid with sulfur tetrafluoride in the presence of a Lewis acid, a Lewis base, and an inert solvent at a temperature within the range of about 0° C. and about 100° C., said Lewis acid being present in the proportion of at least 1 mole per mole of steroid starting material for each carbonyl function in the latter to be fluorinated and said Lewis base being present in the proportion of from about 0.1 to about 0.9 mole per mole of Lewis acid whereby the oxygen atom in the formyl group of the starting steroid is replaced by two fluorine atoms.

10. A process for selectively fluorinating a formyl group present in a steroid which also contains a keto group to form the corresponding difluoromethyl steroid, which comprises reacting said steroid with sulfur tetrafluoride in the presence of a Lewis acid, a Lewis base, and an inert solvent at a temperature within the range of about 0° C. and about 100° C., said Lewis acid being present in the proportion of at least 1 mole per mole of steroid starting material for each carbonyl function in the latter to be fluorinated, said Lewis base being present in the proportion of from about 0.1 to about 0.9 mole per mole of Lewis acid, and said sulfur tetrafluoride being present in the proportion of at least 2 moles per mole of steroid starting material for each carbonyl function in the latter to be fluorinated whereby the oxygen atom in the formyl group of the starting steroid is replaced by two fluorine atoms.

11. A process for selectively fluorinating a formyl group present in a steroid which also contains a keto group to form the corresponding difluoromethyl steroid, which comprises reacting said steroid with sulfur tetrafluoride in the presence of hydrogen fluoride, a Lewis base, and an inert solvent at a temperature in the range of about 0° C. and about 100° C., the hydrogen fluoride being present in the proportion of about 1.3 mole to about 20 moles per mole of steroid starting material for each carbonyl function in the latter to be fluorinated, the sulfur tetrafluoride being present in the proportion of about 13 moles to about 100 moles per mole of steroid starting material for each carbonyl function in the latter to be fluorinated, and said Lewis base being present in the proportion of from about 0.1 to about 0.9 mole per mole of hydrogen fluoride whereby the oxygen atom in the formyl group of the starting steroid is replaced by two fluorine atoms.

References Cited by the Examiner

UNITED STATES PATENTS 2,859,245  11/58  Smith _____ 260—544
3,163,661  12/64  Tadanier et al. _____ 260—397.3

OTHER REFERENCES

Hasek et al.; J.A.C.S. 82, 543–551 (1960).
Smith et al.; J.A.C.S. 81, 3165–3166 (1959).

LEWIS GOTTS, *Primary Examiner.*

LESLIE H. GASTON, *Examiner.*